(12) United States Patent
Gurvich et al.

(10) Patent No.: US 10,539,174 B2
(45) Date of Patent: Jan. 21, 2020

(54) COMPOSITE JOINT ASSEMBLY (71) Applicant: GOODRICH CORPORATION, Charlotte, NC (US)

(72) Inventors: Mark R. Gurvich, Middletown, CT (US); Rony Giovanni Ganis, Oakville (CA)

(73) Assignee: GOODRICH CORPORATION, Charlotte, NC (US)

( * ) Notice: Subject to any disclaimer, the term of this patent is extended or adjusted under 35 U.S.C. 154(b) by 422 days.

(21) Appl. No.: 15/376,016

(22) Filed: Dec. 12, 2016

(65) Prior Publication Data

US 2018/0163761 A1  Jun. 14, 2018

(51) Int. Cl.
*F16C 3/02* (2006.01)
*B29C 57/02* (2006.01)
*B29C 57/10* (2006.01)
*B29L 31/06* (2006.01)

(52) U.S. Cl.
CPC .............. *F16C 3/026* (2013.01); *B29C 57/10* (2013.01); *F16C 3/023* (2013.01); *B29L 2031/06* (2013.01); *Y10T 403/49* (2015.01); *Y10T 403/69* (2015.01)

(58) Field of Classification Search
CPC ..... B29C 57/02; B29C 57/10; B29L 2031/06; F16B 7/02; F16B 17/004; F16C 3/023; F16C 3/026; F16D 1/072; F16D 1/08; F16D 1/0852; Y10T 403/49; Y10T 403/4958; Y10T 403/53; Y10T 403/535; Y10T 403/69; Y10T 403/7064; Y10T 403/7073
USPC .... 403/274, 281, 289, 290, 344, 374.1, 375; 464/181–183
See application file for complete search history.

(56) References Cited

U.S. PATENT DOCUMENTS

| | | | | |
|---|---|---|---|---|
| 2,152,076 | A * | 3/1939 | Menough | F27D 3/026 193/37 |
| 4,279,275 | A | 7/1981 | Stanwood et al. | |
| 4,289,557 | A * | 9/1981 | Stanwood | F16C 3/026 156/171 |
| 4,755,406 | A | 7/1988 | Fuchs | |
| 4,848,957 | A | 7/1989 | Umeda | |
| 5,397,272 | A * | 3/1995 | Smiley | F16C 3/026 464/181 |

(Continued)

FOREIGN PATENT DOCUMENTS

| | | | | |
|---|---|---|---|---|
| DE | 3228110 A1 * | 2/1984 | | F16C 3/026 |
| EP | 1108602 A1 * | 6/2001 | | B60K 17/22 |
| GB | 2258899 | 2/1993 | | |

OTHER PUBLICATIONS

European Patent Office, European Search Report dated Apr. 19, 2018 in Application No. 17206801.7-1014.

*Primary Examiner* — Josh Skroupa
(74) *Attorney, Agent, or Firm* — Snell & Wilmer L.L.P.

(57) ABSTRACT

The composite tube may include a body having a longitudinal centerline axis and at least one end portion. The at least one end portion may include a plurality of segments that are angled relative to the longitudinal centerline axis and are circumferentially separated from each other by a plurality of slits. The composite tube may be implemented in a joint assembly that includes a support wedge. The support wedge may at least partially engage at least one of a radially inward surface of the at least one end portion and a radially outward surface of the at least one end portion.

18 Claims, 11 Drawing Sheets

(56) References Cited

U.S. PATENT DOCUMENTS

| | | |
|---|---|---|
| 7,137,617 B2 | 11/2006 | Sjostedt |
| 8,455,067 B2 | 6/2013 | Maier et al. |
| 2015/0377400 A1 | 12/2015 | Rosenthal |
| 2016/0033063 A1 | 2/2016 | Leslie et al. |
| 2018/0100538 A1* | 4/2018 | Hyson .................... F16C 3/026 |

\* cited by examiner

COMPOSITE JOINT ASSEMBLY

FIELD

The present disclosure relates generally to composite joints and more specifically to improving load transfer via composite joints.

BACKGROUND

Conventionally, various types of aircraft utilize actuators including, for example, to deploy nose, body, and/or wing landing gear systems. Conventional actuator components are made of metallic materials and often comprise complex geometries and high strengths. However, these metallic components are typically heavy.

Substitution of metals by fiber-reinforced polymer-matrix composites (PMC) is one way to reduce weight of landing gears or aircraft actuators. Among significant challenges is implementation of strong joints for load transfer from composite elements to metallic parts. The composite elements are typically fabricated in the form of tubes and are capable of handling significant axial loads under both tension and compression. However, conventional methods of attaching composite materials to other materials can reduce the structural performance of the joint, especially when, for example, the majority of fibers in a polymer-matrix composite tube have a zero orientation and are thus parallel to the longitudinal/centerline axis of the composite tube.

SUMMARY

In various embodiments, the present disclosure provides a composite tube. The composite tube may include a body having a longitudinal centerline axis and at least one end portion. The at least one end portion may include a plurality of segments that are angled relative to the longitudinal centerline axis and are circumferentially separated from each other by a plurality of slits.

In various embodiments, the plurality of segments are flared radially outwards relative to the longitudinal centerline axis. In various embodiments, the plurality of segments are flared radially inwards relative to the longitudinal centerline axis. In various embodiments, a majority of fibers extending in the body are parallel to the longitudinal centerline axis. In various embodiments, the plurality of slits respectively have key-hole shapes.

In various embodiments, the plurality of segments respectively include base portions connected to the body and tip portions, wherein the tip portions of the plurality of segments cumulatively form a segmented rim. The segmented rim may have a cross-sectional size that is different than a cross-sectional size of the body.

Also disclosed herein, according to various embodiments, is a joint assembly. The joint assembly includes a composite tube having a body and at least one end portion. The body may have a longitudinal centerline axis and the at least one end portion may be is angled relative to the longitudinal centerline axis. The joint assembly further includes a support wedge that at least partially engages at least one of a radially inward surface of the at least one end portion and a radially outward surface of the at least one end portion.

In various embodiments, the at least one end portion of the composite tube includes a plurality of segments that are angled relative to the longitudinal centerline axis and are circumferentially separated from each other by a plurality of slits. In various embodiments, the plurality of segments are flared radially outwards relative to the longitudinal centerline axis. In various embodiments, the plurality of segments are flared radially inwards relative to the longitudinal centerline axis. The support wedge may be a first support wedge and the joint assembly may further include a second support wedge that engages the other of the radially inward surface and the radially outward surface.

In various embodiments, the support wedge is an external support wedge that has an annular structure that is concentric with the longitudinal centerline axis and that circumscribes the at least one end portion of the composite tube. In various embodiments, a cross-sectional shape of at least one of the body of the composite tube, the at least one end portion of the composite tube, and the support wedge is non-circular.

Also disclosed herein, according to various embodiments, is a method of forming a joint assembly. The method may include cutting a plurality of slits into an end portion of a composite tube. A plurality of segments of the composite tube may be circumferentially separated from each other by the plurality of slits. The method may further include bending the plurality of segments relative to a longitudinal centerline axis of the composite tube and engaging a support wedge to the end portion of the composite tube to support the plurality of segments. Still further, the method may include curing the composite tube.

In various embodiments, engaging the support wedge to the end portion of the composite tube occurs after bending the plurality of segments relative to the centerline axis of the composite tube. In various embodiments, engaging the support wedge to the end portion of the composite tube comprises engaging a frustoconical surface of the support wedge against at least one of radially inward surfaces of the plurality of segments of the end portion and radially outward surfaces of the plurality of segments of the end portion. In various embodiments, the support wedge is an annular external support wedge and the method further includes positioning the annular external support wedge about the composite tube before bending the plurality of segments relative to the longitudinal centerline axis of the composite tube. In various embodiments, the method further includes wrapping fiber-reinforced composite sheets to form the composite tube before cutting the plurality of slits into the end portion of the composite tube, wherein a majority of fibers of the composite tube are parallel to the longitudinal centerline axis of the composite tube. In various embodiments, a majority of fibers of the composite tube are parallel to the longitudinal centerline axis of the composite tube.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. Throughout the present disclosure, like reference numbers denote like elements.

The present disclosure describes composite tubes and composite joint assemblies. In various embodiments, the present disclosure relates to connecting composite tubes to other components via a composite joint assembly (e.g., "joints"). Such joints may be used in aircraft systems, such as, for example, landing gear systems. However, the systems and methods of the present disclosure may be suitable for use in non-aircraft systems as well. The present disclosure may be implemented with composite tubes that have cross-sections, orthogonal to the tube longitudinal centerline axis, that have different shapes such as circular, rectangular, polygonal, or any other shape.

A first component that is "axially outward" of a second component means that a first component is positioned at a greater distance in either longitudinal direction away from the longitudinal center of the composite component along its longitudinal axis than the second component. A first component that is "axially inward" of a second component means that the first component is positioned closer to the longitudinal center of the composite component along its longitudinal axis than the second component.

A first component that is "radially outward" of a second component means that the first component is positioned at a greater distance away from the longitudinal centerline axis of the composite component than the second component. A first component that is "radially inward" of a second component means that the first component is positioned closer to the longitudinal centerline axis of the composite component than the second component.

As mentioned above, substitution of metals by polymer-matrix composites (PMC) is one way to reduce weight of landing gears or aircraft actuators. Among significant challenges is implementation of strong joints for load transfer from composite tube elements to metallic parts. In various embodiments, the composite tubes are fabricated to handle significant axial loads under both tension and compression. In various embodiments, a majority of the fibers of a composite tube may have a predominantly zero orientation and thus may be substantially parallel with the longitudinal centerline axis of the composite tube. For example, the composite tube may be fabricated using a wrapping technique, as described in greater detail below, which promotes the above mentioned zero orientation of the fibers (e.g., angle between fiber extension direction and longitudinal centerline axis of the composite tube is substantially zero).

Significant stress concentrations may be generated in areas of the joint in response to axial loading of the composite tube. Similar stress concentrations are also expected in cases of axial compression. These stress concentrations indicate the most loaded locations in the composite element and, therefore, may be main factors affecting limits of their structural performance, i.e., their strength. Accordingly, the present disclosure, according to various embodiments, relates to improving joint strength of composite joint assemblies.

Figure 1A:
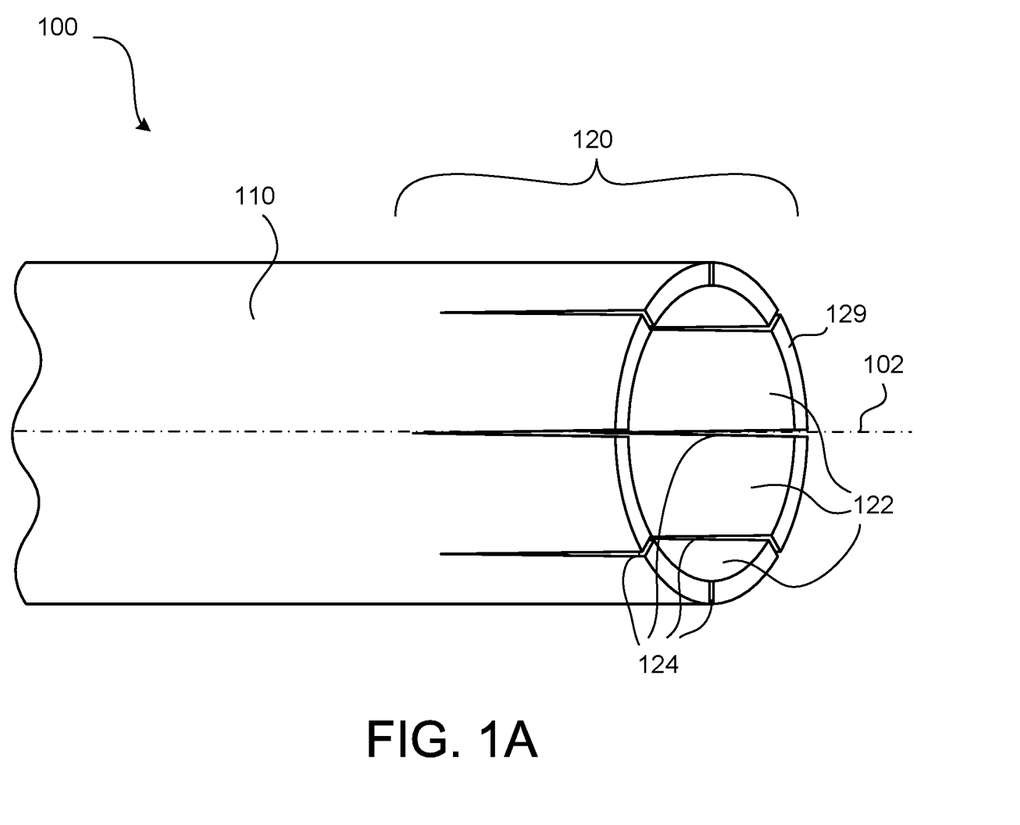
FIG. 1A illustrates a perspective view of an end portion of a composite tube having a plurality of segments circumferentially separated by a plurality of slits, in accordance with various embodiments.

With reference to FIG. 1A, a composite tube 100 is illustrated having a body 110 and an end portion 120. The end portion 120, according to various embodiments, includes a plurality of segments 122 that are circumferentially separated from each other by a plurality of slits 124. As described in greater detail below with reference to FIG. 8, the plurality of slits 124 may be cut substantially axially (e.g., may be substantially parallel with a longitudinal centerline axis 102 of the composite tube 100) into the end portion 120 of the composite tube 100. Accordingly, the end portion 120 may have a segmented end rim 129.

In various embodiments, the composite tube 100 defines a hollow chamber extending along the longitudinal centerline axis 102. The composite tube 100 may by cylindrical and thus may have a circular cross-sectional shape. In various embodiments, the composite tube 100 (e.g., the body 110 and/or end portion 120) may have other cross-sectional shapes, such as quadratic, rectangular, polygonal, oval, or ellipsoidal, among others, as described below with reference to FIGS. 9A and 9B and FIGS. 10A and 10B.

The composite tube 100, as mentioned above, may be a polymer-matrix composite (e.g., a fiber-reinforced polymer). In various embodiments, the composite tube 100 is made from a carbon fiber composite material or a glass fiber composite material or organic fiber reinforced composite materials or a combination thereof. The weight, strength, and stiffness of composite tubes may be dictated by fiber type, fiber stiffness, fiber strength, fiber direction/placement, resin system used, and other parameters of the composite lay-up.

Figure 1B:
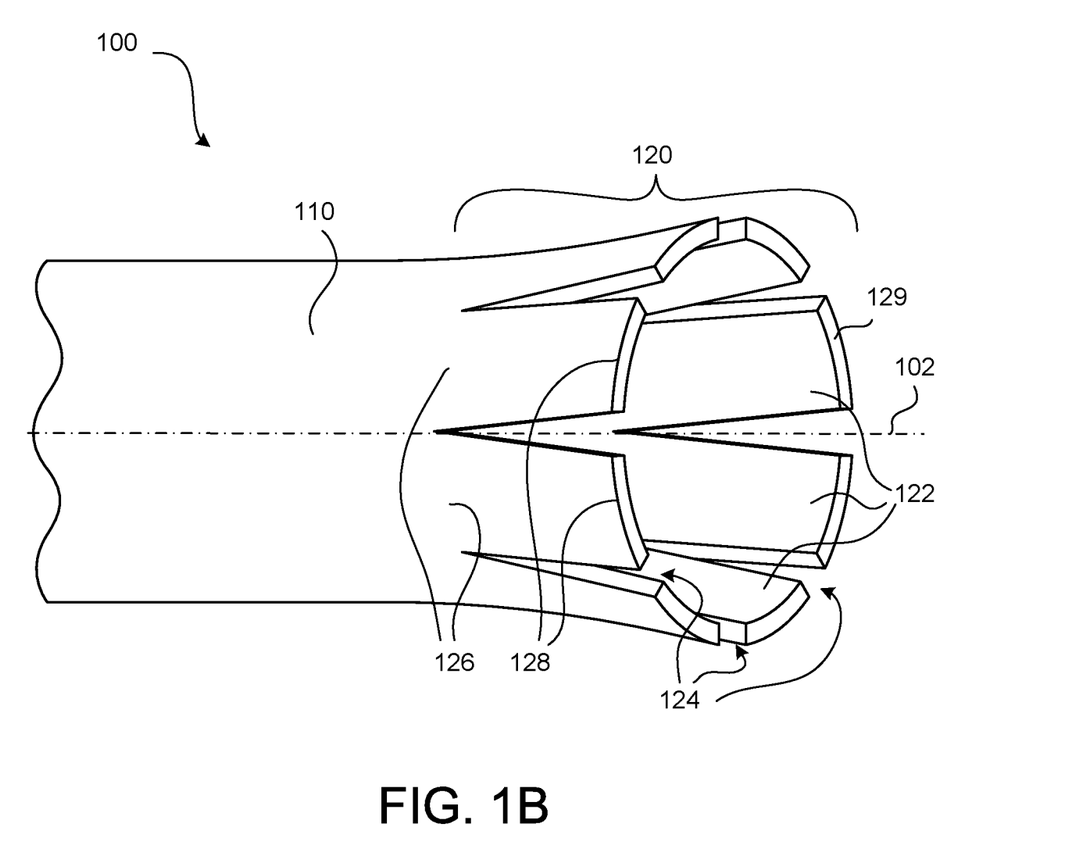
FIG. 1B illustrates a perspective view of the end portion of the composite tube of FIG. 1A, but with the plurality of segments flared/angled radially outward, in accordance with various embodiments.
Figure 2A:
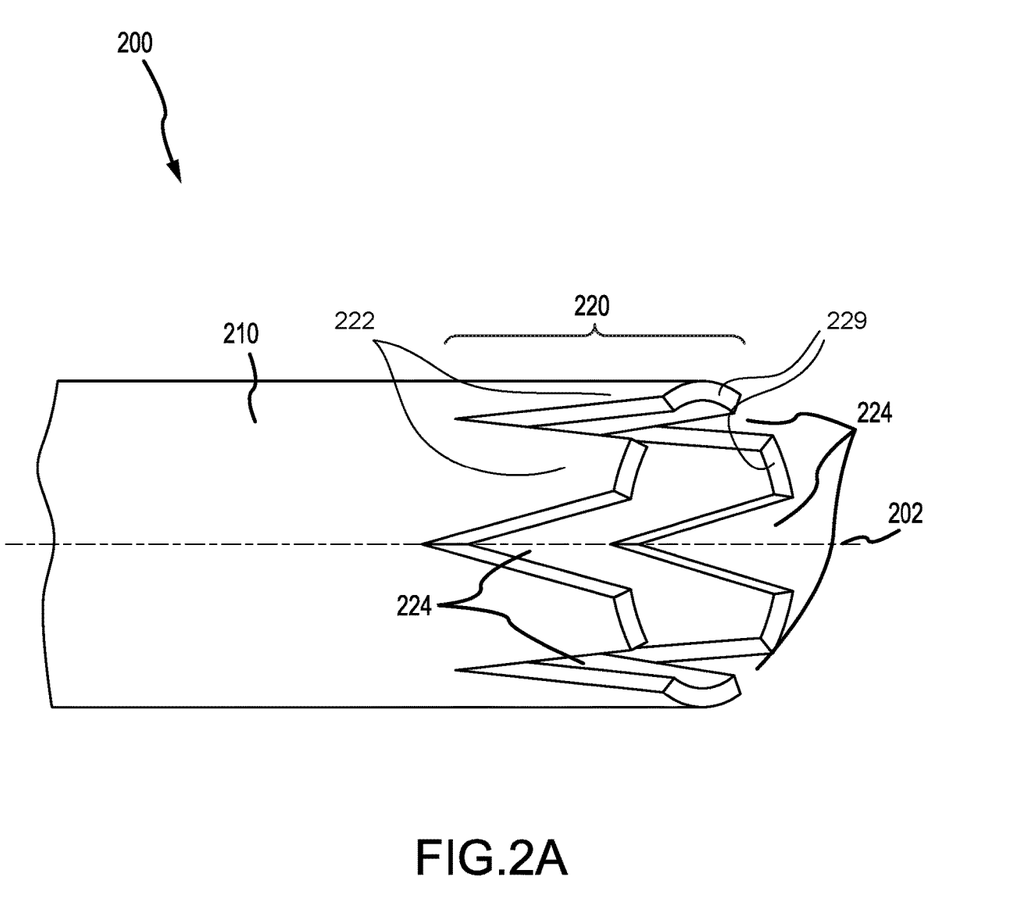
FIG. 2A illustrates a side view of an end portion of a composite tube having a plurality of segments flared radially inward, in accordance with various embodiments.
Figure 2B:
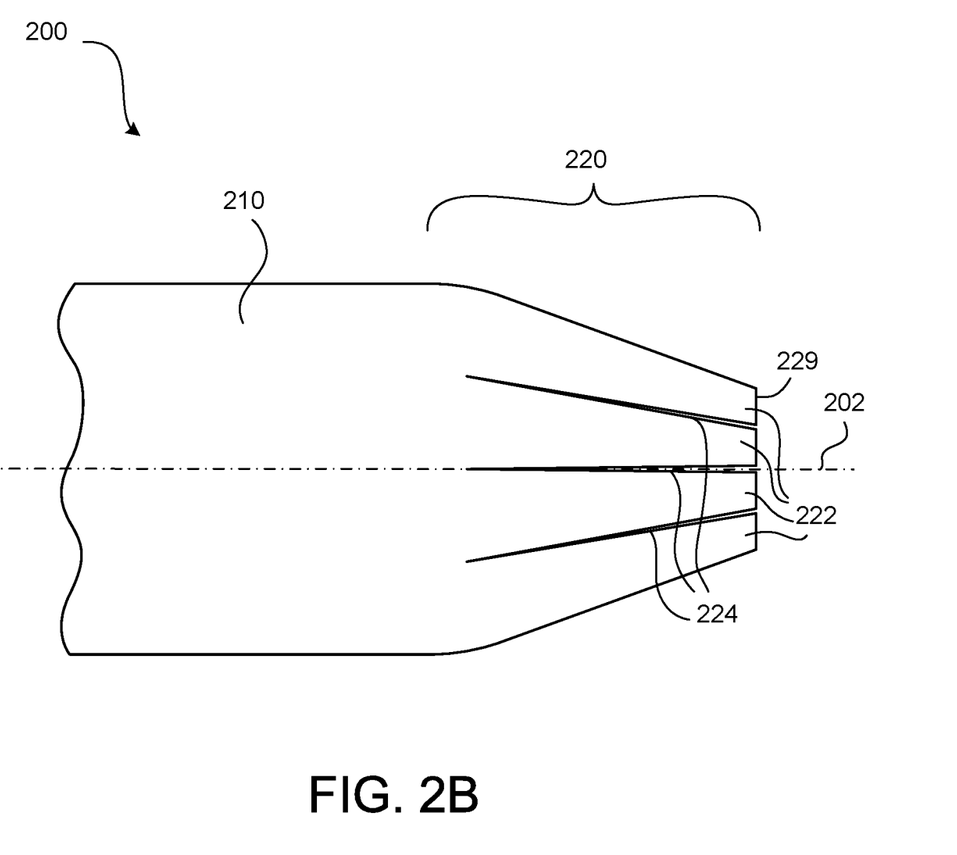
FIG. 2B illustrates a perspective view of the end portion of the composite tube of FIG. 2A, but with the plurality of segments flared/angled radially inward, in accordance with various embodiments.
Figure 3A:
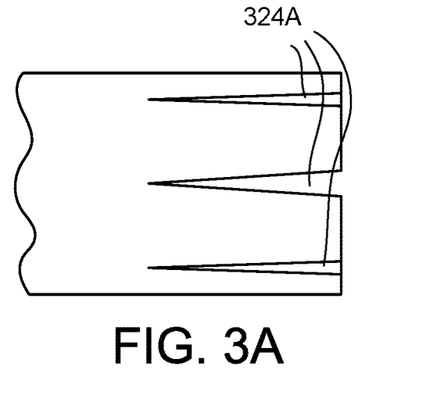
FIGS. 3A, 3B, 3C, 3D, and 3E illustrate side views of end portions of a composite tube having slits of various shapes, in accordance with various embodiments.
Figure 3B:
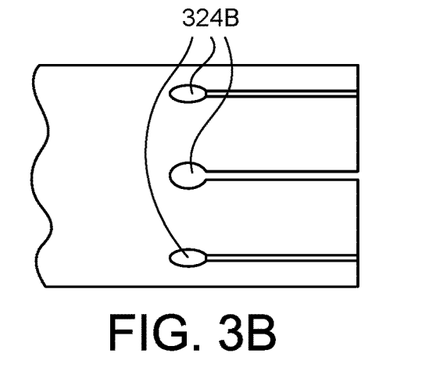
Figure 3C:
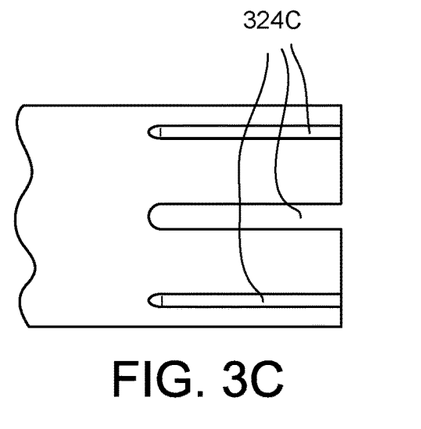
Figure 3D:
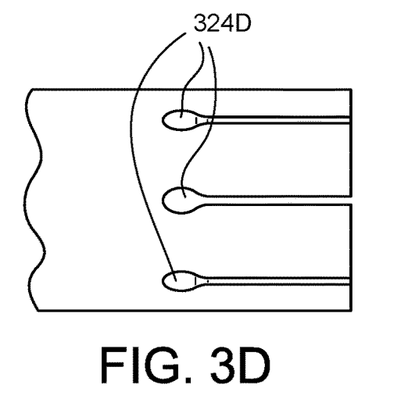
Figure 3E:
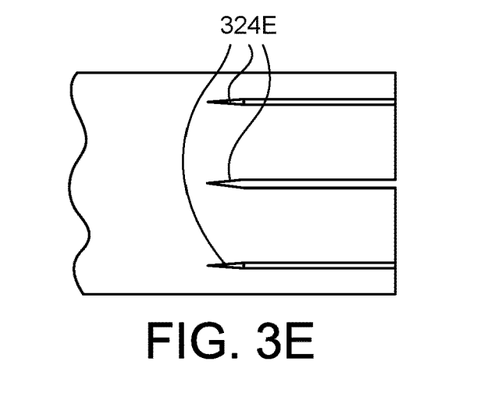

With reference to FIG. 1B, and in accordance with various embodiments, the plurality of segments 122 of the end portion 120 of the composite tube 100 are bent so as to be angled/tapered relative to the longitudinal centerline axis 102 of the composite tube 100. For example, the plurality of segments 122 may be flared radially outwards relative to the longitudinal centerline axis 102. That is, base portions 126 of the plurality of segments 122 may be connected to the body 110 and tip portions 128 of the plurality of segments 122 may extend, for example, radially inward and may cumulatively form a segmented end rim 129. With reference to FIGS. 2A and 2B, the plurality of slits 224 may have a tapering "v" shape and thus the plurality of segments 222, separated by the plurality of slits 224, of the end portion 220 of the composite tube 200 can be flared radially inwards relative to the longitudinal centerline axis 202, in accordance with various embodiments. Accordingly, the rim 129, 229 of the end portion 120, 220 of the composite tube 100, 200 may have a cross-sectional dimension that is larger (with reference to FIG. 1B) or smaller (with reference to FIG. 2B) than the cross-sectional dimension of the body 110, 210 of the composite tube 100, 200. In various embodiments, the cross-sectional shape of the end rim 129, 229 may also be different than the cross-sectional shape of the body 110, 210 of the composite tube 100, 200. For example, the body 110, 210 of the composite tube 100, 200 may be cylindrical and thus may have a circular cross-sectional shape and the plurality of segments 122, 222 may be bent in such a fashion that the rim 129, 229 may have, for example, a rectangular shape. As described in greater detail below, the flared/angled/tapered end portion 120, 220 of the composite tube 100, 200 may improve the strength of a joint between the composite tube 100, 200 and another component.

In various embodiments, and with reference to FIGS. 3A-3E, the plurality of slits 324A, 324B, 324C, 324D, 324E may have various shapes, geometries, and/or configurations. For example, in various embodiments the plurality of slits 324A have a tapering shape and thus the slits 324A may converge, in a direction from the end portion towards the body, to a point. In such embodiments, because the slits 324A have a larger gap at the rim, the plurality of segments between the slits 324A may be bent radially inward. In further embodiments, the plurality of slits 324B may have a key-hole shape/geometry, the plurality of slits 324E may have a straight channel configuration with sharp, "v" shaped tips/ends, the plurality of slits 324C may have a straight channel configuration with rounded tips/ends, or the plurality of slits 324D may have a curved, bulbous end/tip, similar to the key-hole configuration. Accordingly, the plurality of slits 324A, 324B, 324C, 324D, 324E may have various shapes, geometries, and/or configurations and may be specifically tailored for a specific bend/taper.

Figure 4:
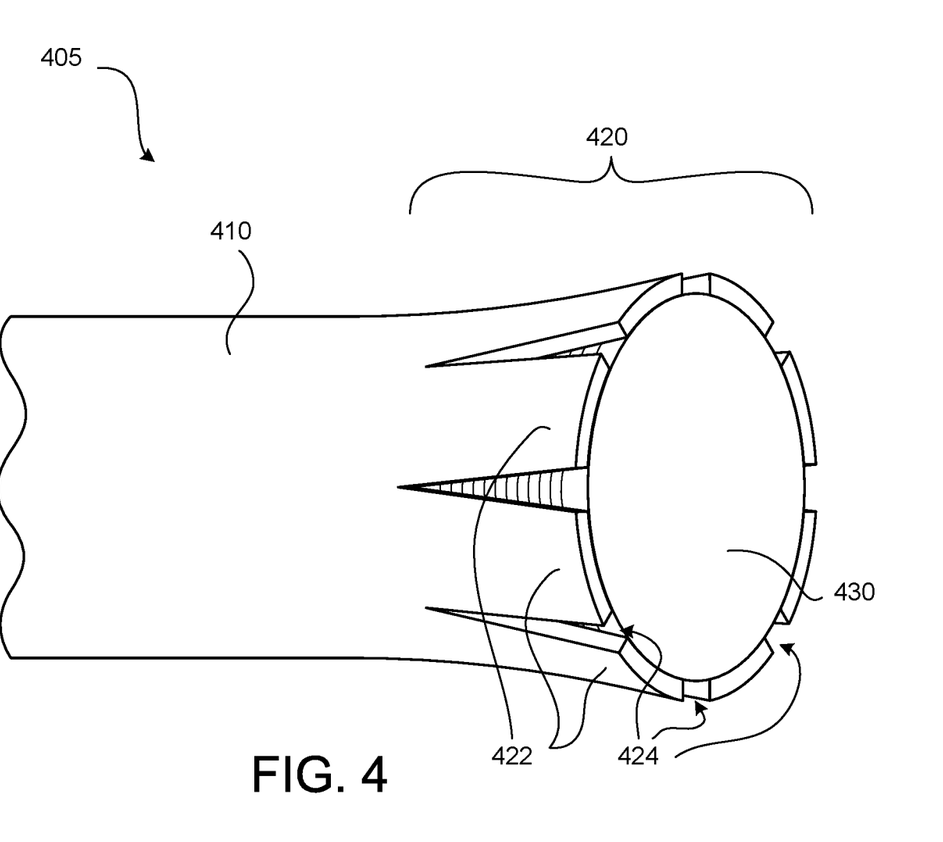
FIG. 4 illustrates a perspective view of a joint assembly, in accordance with various embodiments.

With reference to FIG. 4, and in accordance with various embodiments, a joint assembly 405 is provided. The joint assembly 405 includes a composite tube, having a body 410 and an end portion 420, and a support wedge 430. The support wedge 430 at least partially engages at least one of a radially inward surface of the end portion 420 and/or a radially outward surface of the end portion 420. The engagement between the support wedge 430 and the end portion 420 may be direct contact, according to various embodiments. As described above, the flared end portion 420 may have a converging or diverging frustoconical geometry and the support wedge 430 may have a complementary frustoconical geometry. In various embodiments, the support wedge 430 is made from a metallic material. The support wedge 430 may be made from other materials, such as fiber-reinforced PMC, wood, and/or ceramic materials, among others. The support wedge 430 may be held against (e.g., engaged with) the plurality of segments 422 (circumferentially separated from each other by the plurality of slits 424) of the end portion 420 of the composite tube using adhesives, resins, boding agents, or other similar attachment means.

Figure 5:
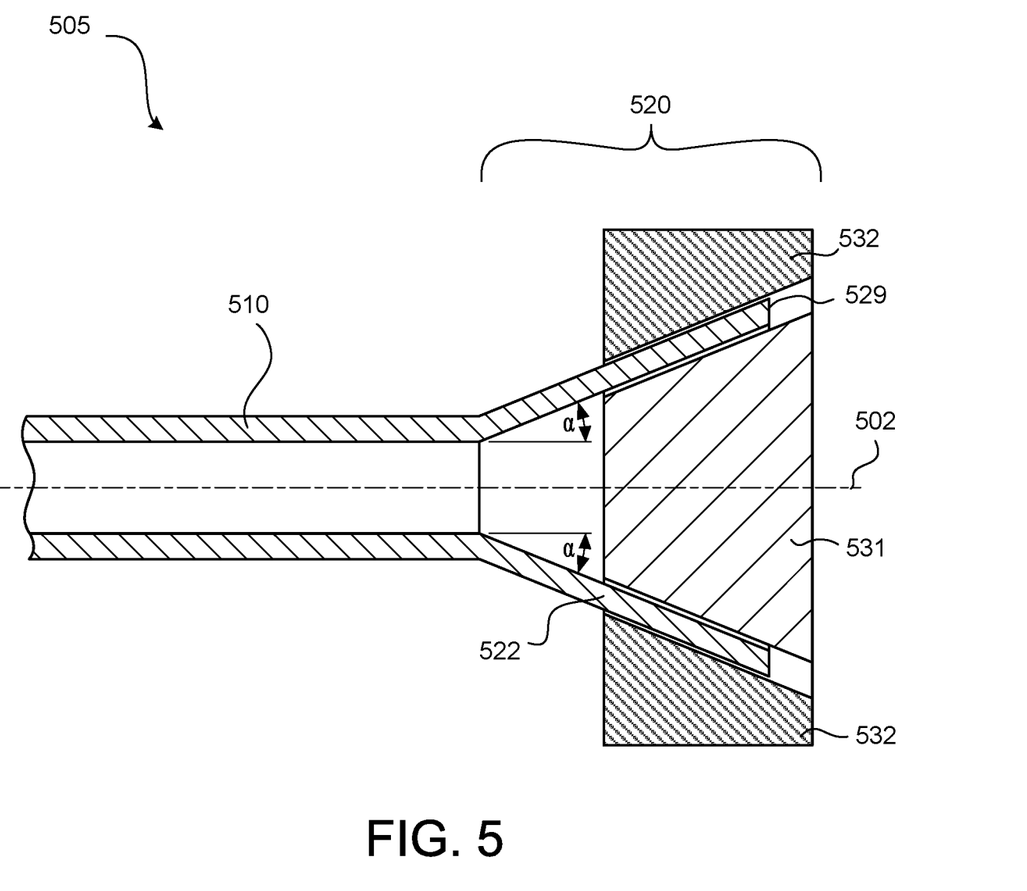
FIG. 5 illustrates a cross-sectional view of a joint assembly, in accordance with various embodiments.

In various embodiments, and with reference to FIG. 5, the joint assembly 505 may include a first support wedge 531 and a second support wedge 532. The first support wedge 531 may be an internal support wedge 531 and thus may be inserted within the rim 529 formed by the bent plurality of segments 522 to engage a radially inward surface of the flared end portion 520. The second support wedge 532 may be an annular external support wedge 532 that is disposed about and substantially circumscribes the end portion 520 to engage a radially outward surface of the flared end portion 520. As described above, the end portion 520 may be flared radially outwardly to have a diverging rim 529.

In various embodiments, "α" is the angle between the longitudinal centerline axis 502 of the body 510 of the composite tube and the plurality of segments 522 that form the flared end 520. In various embodiments, α is at least 5 degrees. In various embodiments, the plurality of segments 522 are bent to a according to the specifics of a given application/configuration (e.g., depending on an expected/anticipated load transfer).

In various embodiments, flared end portion 520 may be secured to the support wedge(s) 531, 532 using various attachment mechanisms, as mentioned above, and/or the support wedges 531, 532 may be cumulatively provide a clamping/retaining force on the plurality of segments 522 of the flared end portion 520. In various embodiments, the annular external support wedge 532 may be configured to engage or otherwise interact with the internal support wedge 531 in order to compress the plurality of segments 522 between the two support wedges 531, 532. The support wedge(s) 531, 532 may eliminate the need for threading or drilling of the end portion 520 and/or the body 510. As described in greater detail below, the support wedge(s) 531, 532 may be engaged with the end portion 520 during fabrication of the composite tube or the support wedge(s) 531, 532 may be engaged with the end portion 520 after formation/curing of the composite tube.

Figure 6:
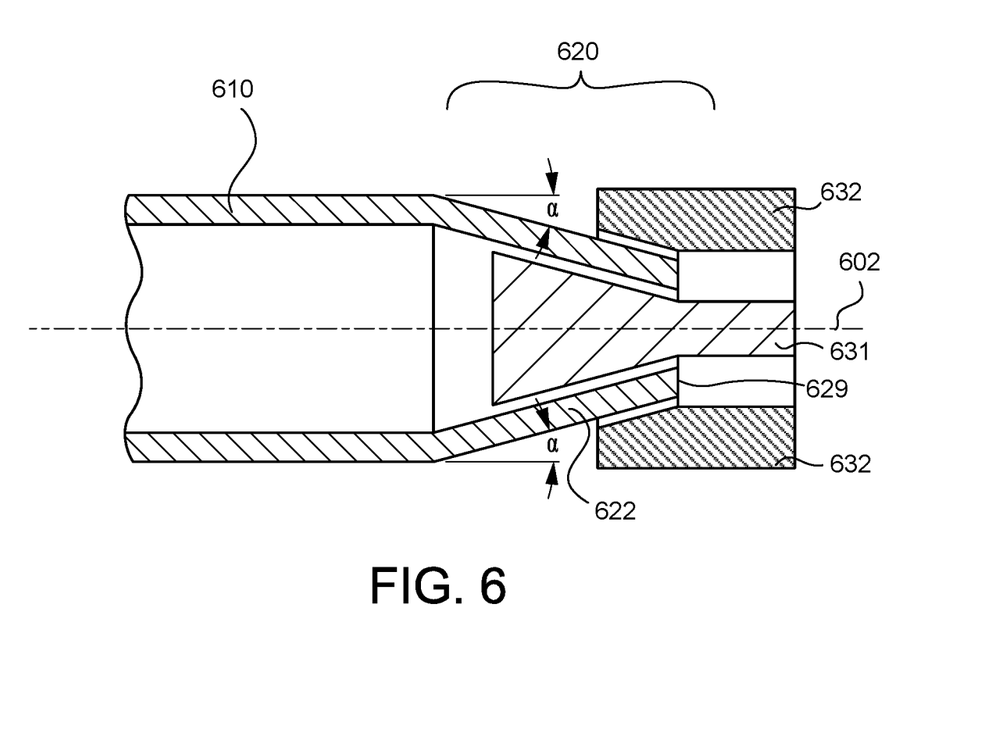
FIG. 6 illustrates a cross-sectional view of a joint assembly, in accordance with various embodiments.

In various embodiments, and with reference to FIG. 6, the joint assembly 605 may include a first support wedge 631 and a second support wedge 632. The first support wedge 631 may be an internal support wedge 631 and thus may be inserted within the rim 629 formed by the bent plurality of segments 622 to engage a radially inward surface of the flared end portion 620. The second support wedge 632 may be an annular external support wedge 632 that is disposed about and substantially circumscribes the end portion 620 to engage a radially outward surface of the flared end portion 620. As described above, the end portion 620 may be flared radially inwardly to have a converging/tapered rim 629.

In various embodiments, "α" is the angle between the longitudinal centerline axis 602 of the body 610 of the composite tube and the plurality of segments 622 that form the flared end 620. In various embodiments, α is at least 5 degrees. In various embodiments, the plurality of segments 622 are bent to α according to the specifics of a given application/configuration (e.g., depending on an expected/anticipated load transfer).

In various embodiments, flared end portion 620 may be secured to the support wedge(s) 631, 632 using various attachment mechanisms, as mentioned above, and/or the support wedges 631, 632 may be cumulatively provide a clamping/retaining force on the plurality of segments 622 of the flared end portion 620. In various embodiments, the annular external support wedge 632 may be configured to engage or otherwise interact with the internal support wedge 631 in order to compress the plurality of segments 622 between the two support wedges 631, 632. The support wedge(s) 631, 632 may eliminate the need for threading or drilling of the end portion 620 and/or the body 610. As described in greater detail below, the support wedge(s) 631, 632 may be engaged with the end portion 620 during fabrication of the composite tube or the support wedge(s) 631, 632 may be engaged with the end portion 620 after formation/curing of the composite tube.

Figure 7A:
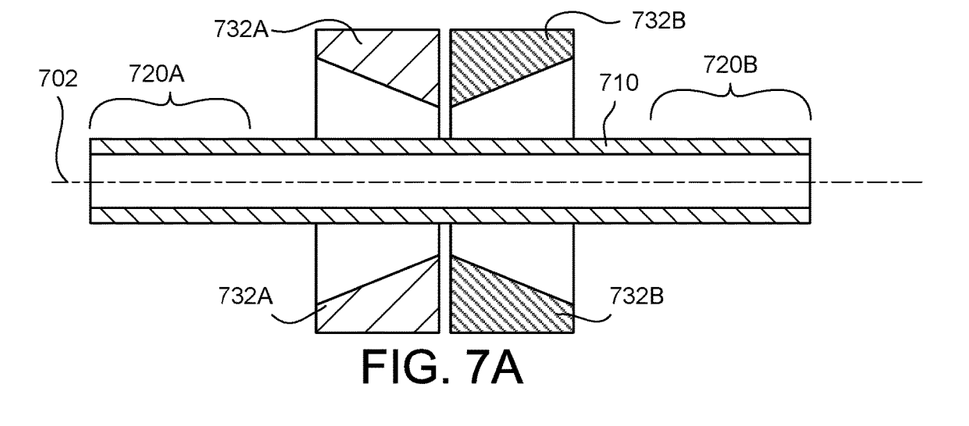
FIGS. 7A, 7B and 7C illustrate cross-sectional views of installing a support wedge relative to a composite tube, in accordance with various embodiments.
Figure 7B:
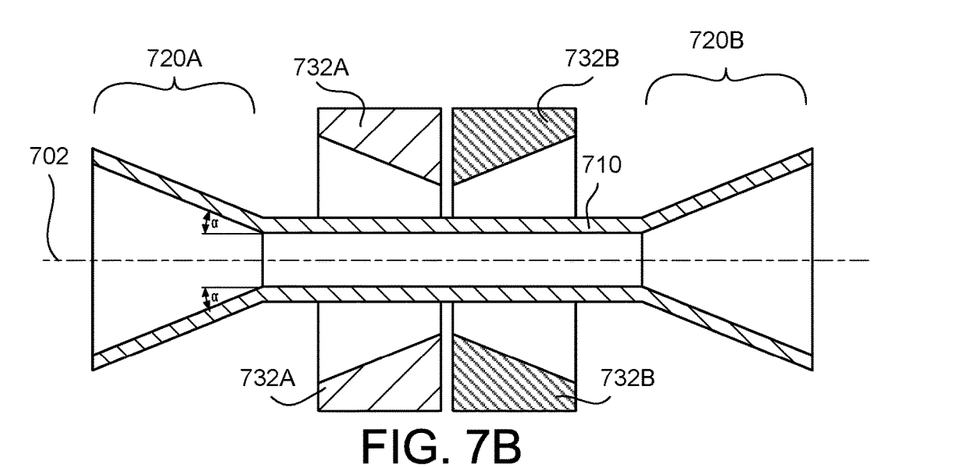
Figure 7C:
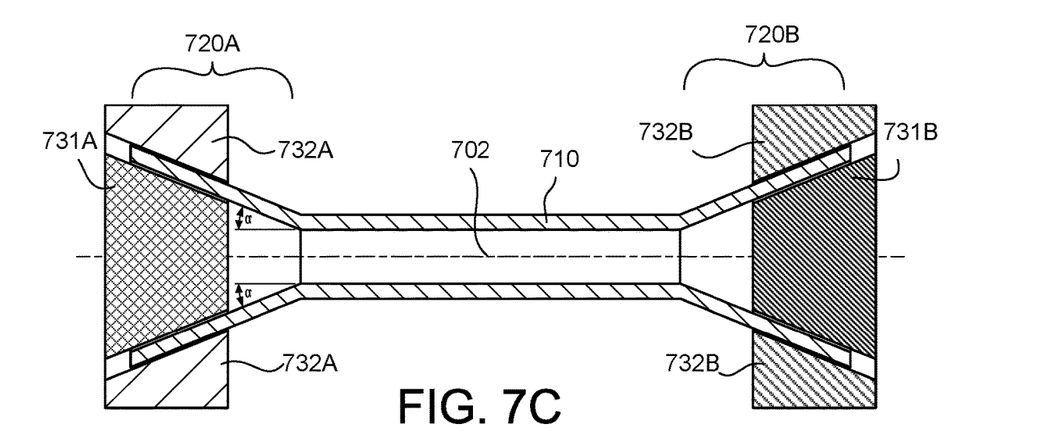

In various embodiments, and with reference to FIGS. 7A-7C, a composite tube having two end portions 720A, 720B disposed at opposing ends of a body 710 is provided. Slits may be cut into the end portions 720A, 720B and the end portions 720A, 720B may be bent/flared (e.g., radially outwards). Before bending the segments of the end portions 720A, 720B, two annular external support wedges 732A, 732B may be positioned about the body 710, as shown in FIG. 7A. After bending the end portions 720A, 720B relative to the longitudinal centerline axis 702 (with reference to FIG. 7B), the external support wedges 732A, 732B may be respectively moved axially towards respective end portions 720, 720B. In other words, the annular external support wedge(s) 732A, 732B may be positioned/disposed about the body 710 before bending the end portions 720A, 720B because the annular external support wedges(s) 732, 732B may not otherwise be able to be positioned to engage the end portions 720A, 720B (i.e., when the end portions are flared radially outwards). In various embodiments, and as mentioned above, the end portions 720A, 720B may be compressed between the annular external support wedge(s) 732A, 732B and the internal support wedge(s) 731A, 731B. In various embodiments, the annular external support wedge(s) 732A, 732B has an angled/tapered surface on its inner side and the internal support wedge(s) 731A, 731B has an angled/tapered surface on its outer side.

Figure 8:
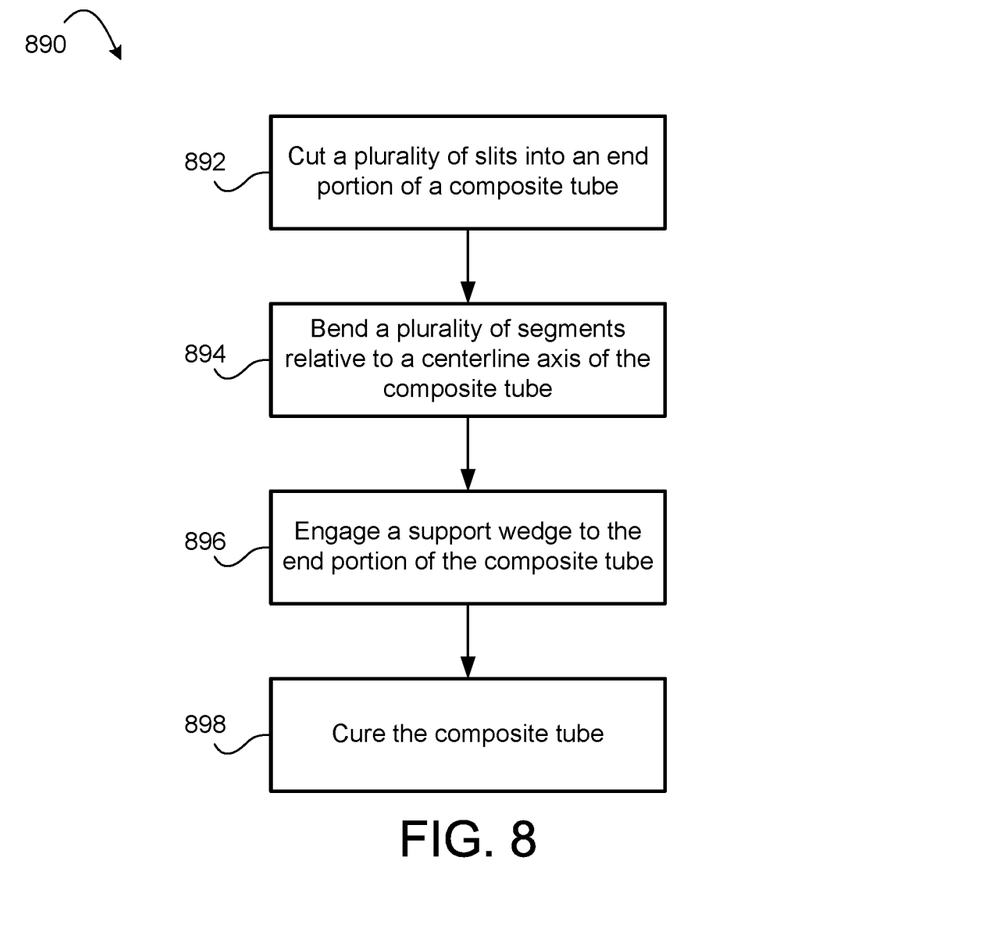
FIG. 8 is a schematic flow chart diagram of a method of manufacturing a joint assembly, in accordance with various embodiments.

With reference to FIG. 8, and in accordance with various embodiments, a method 890 for manufacturing a joint assembly is provided. The method 890 may include cutting a plurality slits into an end portion of a composite tube at step 892. A plurality of segments of the composite tube may be circumferentially separated/spaced apart from each other by the plurality of slits. The method 890 may further include bending the plurality of segments relative to a longitudinal centerline axis of the composite tube at step 894, engaging a support wedge to the end portion of the composite tube at step 896, and curing the composite tube at step 898.

In various embodiments, step 896 of engaging the support wedge to the end portion of the composite tube may occur after step 894 of bending the plurality of segments. In various embodiments, the support wedge includes an annular external support wedge and the method 890 further includes positioning the annular external support wedge about the composite tube before step 894 (i.e., bending the plurality of segments). In various embodiments, the method 890 further includes wrapping fiber sheets to form the composite tube before step 892 (i.e., cutting the slits). For example, sheets of polymer material having parallel fibers (and/or fibers extending in other directions) may be wrapped around a mandrel to create a composite tube layup that has fibers that extend substantially parallel to the centerline/longitudinal axis of the composite tube.

Figures 9A, 9B:
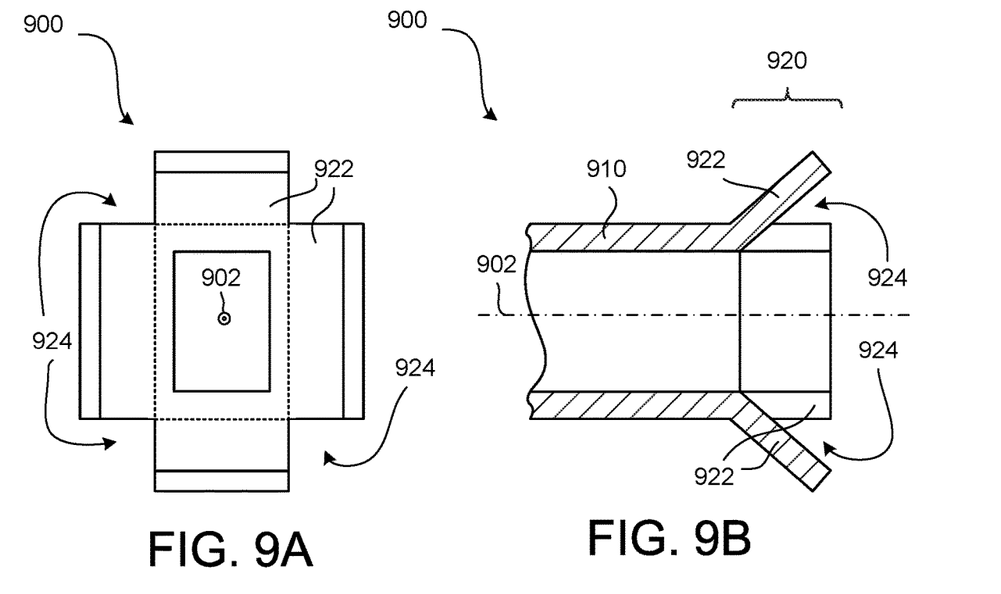
FIGS. 9A and 9B illustrate views of a composite tube having a non-circular cross-sectional shape with segments flared radially outwards, in accordance with various embodiments.
Figures 10A, 10B:
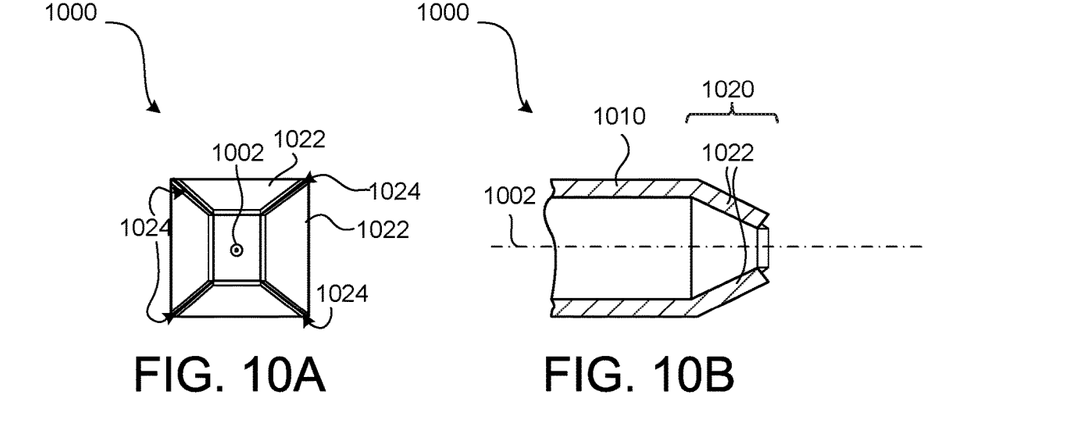
FIGS. 10A and 10B illustrate views of a composite tube having a non-circular cross-sectional shape with segments flared radially inwards, in accordance with various embodiments.

In various embodiments, and with reference to FIGS. 9A and 9B, the body 910 of the composite tube 900 has a rectangular cross-sectional shape (e.g., non-circular) and the segments 922 (separated from each other by slits 924) of the end portion 920 may be bent so as to be flared radially outward relative to the longitudinal centerline axis 902. With reference to FIGS. 10A and 10B, and in accordance with various embodiments, the body 1010 of the composite tube 1000 may have a rectangular cross-sectional shape (e.g. non-circular) and the segments 1022 (separated from each other by slits 1024) of the end portion 1020 may be bent so as to be flared radially outward relative to the longitudinal centerline axis 1002. As mentioned above, a support wedge may be shaped and configured to have a geometry that is complementary to the end portion 920, 1020 of the composite tube 900. Accordingly, the support wedge may have a rectangular cross-sectional shape with tapered sides that complement the angled orientation of the segments 922, 1022.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A composite tube comprising:
   a body comprising a longitudinal centerline axis; and
   at least one end portion, wherein the at least one end portion comprises a plurality of segments that are angled relative to the longitudinal centerline axis and are circumferentially separated from each other by a plurality of slits;
   wherein the plurality of segments respectively comprise base portions connected to the body and tip portions, wherein the tip portions of the plurality of segments cumulatively form a segmented rim; and
   wherein the segmented rim has a cross-sectional shape that is different than a cross-sectional shape of the body.

2. The composite tube of claim 1, wherein the plurality of segments are flared radially outwards relative to the longitudinal centerline axis.

3. The composite tube of claim 1, wherein the plurality of segments are flared radially inwards relative to the longitudinal centerline axis.

4. The composite tube of claim 1, wherein a majority of fibers extending in the body are parallel to the longitudinal centerline axis.

5. The composite tube of claim 1, wherein the plurality of slits respectively have key-hole shapes.

6. The composite tube of claim 1, wherein the segmented rim has a cross-sectional size that is different than a cross-sectional size of the body.

7. A joint assembly comprising:
   a composite tube comprising a body having a longitudinal centerline axis and at least one end portion that is angled relative to the longitudinal centerline axis; and
   a support wedge that at least partially engages at least one of a radially inward surface of the at least one end portion and a radially outward surface of the at least one end portion;
   wherein a cross-sectional shape of the at least one end portion of the composite tube is non-circular;
   wherein the at least one end portion of the composite tube comprises a plurality of segments that are angled relative to the longitudinal centerline axis and are circumferentially separated from each other by a plurality of slits.

8. The joint assembly of claim 7, wherein the plurality of segments are flared radially outwards relative to the longitudinal centerline axis.

9. The joint assembly of claim 7, wherein the plurality of segments are flared radially inwards relative to the longitudinal centerline axis.

10. The joint assembly of claim 7, wherein the support wedge is a first support wedge, wherein the joint assembly further comprises a second support wedge that engages the other of the radially inward surface and the radially outward surface.

11. The joint assembly of claim 7, wherein the support wedge is an external support wedge that has an annular structure that is concentric with the longitudinal centerline axis and that circumscribes the at least one end portion of the composite tube.

12. The joint assembly of claim 7, wherein:
    the plurality of segments respectively comprise base portions connected to the body and tip portions;
    the tip portions of the plurality of segments cumulatively form a segmented rim; and
    the segmented rim has a cross-sectional shape that is different than a cross-sectional shape of the body.

13. A method of forming a joint assembly, the method comprising:
    cutting a plurality of slits into an end portion of a composite tube, wherein a plurality of segments of the composite tube are circumferentially separated from each other by the plurality of slits, wherein the plurality of segments respectively comprise base portions extending from a body of the composite tube and tip portions, wherein the tip portions of the plurality of segments cumulatively form a segmented rim;
    bending the plurality of segments relative to a longitudinal centerline axis of the composite tube, wherein the segmented rim has a cross-sectional shape that is different than a cross-sectional shape of the body;
    engaging a support wedge to the end portion of the composite tube to support the plurality of segments; and
    curing the composite tube.

14. The method of claim 13, wherein engaging the support wedge to the end portion of the composite tube occurs after bending the plurality of segments relative to the centerline axis of the composite tube.

15. The method of claim 14, wherein engaging the support wedge to the end portion of the composite tube comprises engaging a frustoconical surface of the support wedge against at least one of radially inward surfaces of the plurality of segments of the end portion and radially outward surfaces of the plurality of segments of the end portion.

16. The method of claim 14, wherein the support wedge comprises an annular external support wedge, wherein the method further comprises positioning the annular external support wedge about the composite tube before bending the plurality of segments relative to the longitudinal centerline axis of the composite tube.

17. The method of claim 13, further comprising wrapping fiber-reinforced composite sheets to form the composite tube before cutting the plurality of slits into the end portion of the composite tube, wherein a majority of fibers of the composite tube are parallel to the longitudinal centerline axis of the composite tube.

18. The method of claim 13, wherein a majority of fibers of the composite tube are parallel to the longitudinal centerline axis of the composite tube.

* * * * *